(12) United States Patent
Niizuma

(10) Patent No.: US 11,458,737 B2
(45) Date of Patent: *Oct. 4, 2022

(54) INKJET RECORDING METHOD AND INKJET RECORDING APPARATUS

(71) Applicant: Konica Minolta, Inc., Tokyo (JP)

(72) Inventor: Naoto Niizuma, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/226,818

(22) Filed: Apr. 9, 2021

(65) Prior Publication Data

US 2021/0354476 A1 Nov. 18, 2021

(30) Foreign Application Priority Data

May 12, 2020 (JP) .............................. JP2020-083703

(51) Int. Cl.
*B41J 2/21* (2006.01)
*B41J 11/00* (2006.01)

(52) U.S. Cl.
CPC ......... *B41J 2/2132* (2013.01); *B41J 11/0015* (2013.01)

(58) Field of Classification Search
CPC .............................. B41J 2/2132; B41J 11/0015
See application file for complete search history.

(56) References Cited

U.S. PATENT DOCUMENTS

2018/0281492 A1  10/2018  Matsuzaki et al.

FOREIGN PATENT DOCUMENTS

| CN | 109421368 A | 3/2019 | | |
|---|---|---|---|---|
| JP | H08-216393 A | 8/1996 | | |
| JP | 2004-107454 A | 4/2004 | | |
| JP | 2004107454 A | * | 4/2004 | |
| JP | 2011136524 A | * | 7/2011 | ............ B41J 2/2114 |
| JP | 2019-042997 A | 3/2019 | | |
| WO | 2013/050080 A1 | 4/2013 | | |
| WO | 2019/064978 A1 | 4/2019 | | |
| WO | WO-2019064978 A1 | * | 4/2019 | ................ B41J 2/01 |

OTHER PUBLICATIONS

EPO, Extended European Search Report for the related European Patent Application No. 21173634.3, dated Nov. 2, 2021.
CNIPA, Office Action/Search Report for the related Chinese Patent Application No. 202110517070.4, dated Jun. 28, 2022, with English translation.

* cited by examiner

*Primary Examiner* — Justin Seo
(74) *Attorney, Agent, or Firm* — Lucas & Mercanti, LLP

(57) ABSTRACT

Provided is an inkjet recording method comprising the step of forming an image by applying an ink containing at least a coloring material and a processing liquid containing at least a flocculant to a surface of a recording medium by a droplet discharge device, respectively, to coalescence the ink and the processing liquid, wherein the processing liquid is applied to an image forming region on which the image is formed and a peripheral region of the image forming region, and an application amount of the processing liquid to be applied to the peripheral region of the image forming region is controlled to be the same as an application amount of the processing liquid to be applied at an end portion of the image forming region.

6 Claims, 5 Drawing Sheets

Height direction
Scanning direction X
Conveying direction Y:
Nozzle arrangement direction

INKJET RECORDING METHOD AND INKJET RECORDING APPARATUS

CROSS-REFERENCE TO RELATED APPLICATION

The entire disclosure of Japanese Patent Application No. 2020-083703 filed on May 12, 2020 is incorporated herein by reference in its entirety.

BACKGROUND

Technological Field

The present invention relates to an inkjet recording method and an inkjet recording apparatus. More specifically, the present invention relates to an inkjet recording method and an inkjet recording apparatus in which image quality is improved in an image formed on a recording medium, in particular, on a recording medium of low absorption or non-absorption in a two-liquid type inkjet recording method.

Description of the Related Art

In the inkjet recording method, it is known that image quality is deteriorated due to a liquid deviation phenomenon in which dropped inks coalescence on a recording medium or color bleeding in which bleeding occurs between different colors. As a solution to these problems, for example, JP-A 8-52867 discloses a two-liquid type inkjet recording method in which a processing liquid for agglomerating a coloring material in an ink is discharged from an inkjet head (hereinafter, also simply referred to as a "head") separately from the ink and the processing liquid is combined with the ink on the recording medium to fix the ink to the recording medium satisfactorily.

In this two-liquid type inkjet recording system, as a solution to color bleeding, there is disclosed a means of applying a relatively large amount of processing liquid to an image boundary region between colors, and applying a small amount of processing liquid to a peripheral region thereof.

For example, Patent Document 1 (JP-A 8-216393) discloses an inkjet recording method in which a relatively large amount of processing liquid is applied to an image boundary region and by applying the processing liquid to a peripheral region thereof to result in obtaining a good color image without bleeding or feathering phenomenon. In addition, Patent Document 2 (WO 2013/050080) discloses a printing method in which a surface density of a processing liquid in a boundary region of a print area is set relatively high than a surface density of an internal region of a print area, thereby suppressing occurrence of color bleeding and improving image quality.

In addition, Patent Document 3 (JP-A 2019-42997) discloses an inkjet recording method in which a ratio of a flocculant to a pigment is set high in a print area and controlled within a predetermined value in a boundary region for the purpose of preventing a decrease in durability such as scratch resistance of a recorded matter and bleeding at an image boundary region due to an excess of a flocculant.

However, it has been found that if the amount of the processing liquid is made different between the printing region having the same continuous ink application amount and the boundary region, a difference in the aggregation of the ink occurs between the printing region and the boundary region, which leads to a decrease in the image quality such as the quality of the outline character. Further, the color bleeding problem has not been sufficiently solved even in the two-liquid type inkjet recording system.

In addition, in particular, when a recording medium having low absorption and non-absorption, such as a plastic base material, a metal base material, or a leather base material, is used as the recording medium, the above-mentioned effect appears more remarkably, and the conventional two-liquid type inkjet recording method is insufficient as a means for solving these problems.

SUMMARY

The present invention has been made in view of the above problems and status. An object of the present invention is to provide an inkjet recording method and an inkjet recording apparatus which produce an image formed on a recording medium, particularly on a low absorption or non-absorption recording medium, with achieving improved color bleeding resistance, and particularly excellent outline character quality, in a two-liquid type inkjet recording method.

In order to solve the above-mentioned problems, the present inventor has found the following in the process of examining the causes of the above-mentioned problems. That is, in the inkjet recording method using an ink and a processing liquid containing a coagulant, when the processing liquid is applied to an image forming region and a peripheral region of the image forming region, an amount of the processing liquid applied to the peripheral region of the image forming region is controlled to be the same as an amount of the processing liquid applied at an end portion of the image forming region. As a result, it has been found that an inkjet image having improved color bleeding resistance, and in particular, improved quality of outline characters was obtained.

That is, the above problem according to the present invention is solved by the following means.

To achieve at least one of the above-mentioned objects of the present invention, an inkjet recording method that reflects an aspect of the present invention is as follows.

An inkjet recording method for forming an image by applying an ink containing at least a coloring material and a processing liquid containing at least a flocculant to a surface of a recording medium by a droplet discharge device, respectively, to coalescence the ink and the processing liquid, wherein the processing liquid is applied to an image forming region on which the image is formed and a peripheral region of the image forming region, and an application amount of the processing liquid to be applied to the peripheral region of the image forming region is controlled to be the same as an application amount of the processing liquid to be applied at an end portion of the image forming region.

An inkjet recording apparatus that reflects another aspect of the present invention is as follows.

An inkjet recording apparatus for forming an image by applying an ink containing at least a coloring material and a processing liquid containing at least a flocculant to a surface of a recording medium by a droplet discharge device, respectively, to coalescence the ink and the processing liquid, comprising at least a droplet discharge device having a discharge port for discharging the ink and a discharge port for discharging the processing liquid, wherein the inkjet recording apparatus includes a device for applying the processing liquid to an image forming region in which the image is formed and a peripheral region of the image forming region, and controlling an application amount of the processing liquid applied to the peripheral region of the image forming region to be the same as an application amount of the processing liquid applied at an end portion of the image forming region.

According to the above means of the present invention, in a two-liquid type inkjet recording method, it is possible to provide an inkjet recording method and an inkjet recording apparatus which produce an inkjet image formed on a recording medium, particularly on a recording medium having low absorption or non-absorption property, with achieving improved color bleeding resistance, and particularly excellent outline character quality (sharpness).

The expression mechanism or action mechanism of the effect of the present invention is inferred as follows.

As described above, in the two-liquid type inkjet recording method, it has been found that when the amount of the processing liquid is made different between the printing region having the same continuous ink application amount and the boundary region, a difference in the aggregation of the ink occurs between the printing region and the boundary region, resulting in deterioration of the image quality. Further, the color bleeding problem has not been sufficiently solved even in the two-liquid type inkjet recording system. In addition, in particular, a low absorption, non-absorbent base material such as a plastic base material, a metal base material, or a leather base material has remarkably exhibited the above influence, and a conventional two-liquid type inkjet recording method has been insufficient as a means for solving these effects.

In the inkjet recording method of the present invention, it has been found that the above problem may be solved by applying a processing liquid to an image forming region where an image is formed and a peripheral region of the image forming region, and controlling the amount of the processing liquid to be applied to the peripheral region of the image forming region to be the same amount as the amount of the processing liquid at the end portion of the image forming region.

That is, by applying the processing liquid to the image forming region on which the image is formed and the peripheral region of the image forming region, and controlling the amount of the processing liquid to be applied to the peripheral region of the image forming region so as to be the same as the amount of the processing liquid to be applied at the end portion of the image forming region, the coalescence with the ink in the boundary region of the image forming region is further promoted, whereby feathering in the end portion of the inkjet image may be suppressed, thereby drastically improving the quality of the outline character, for example, the sharpness of the ink image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Figure 1:
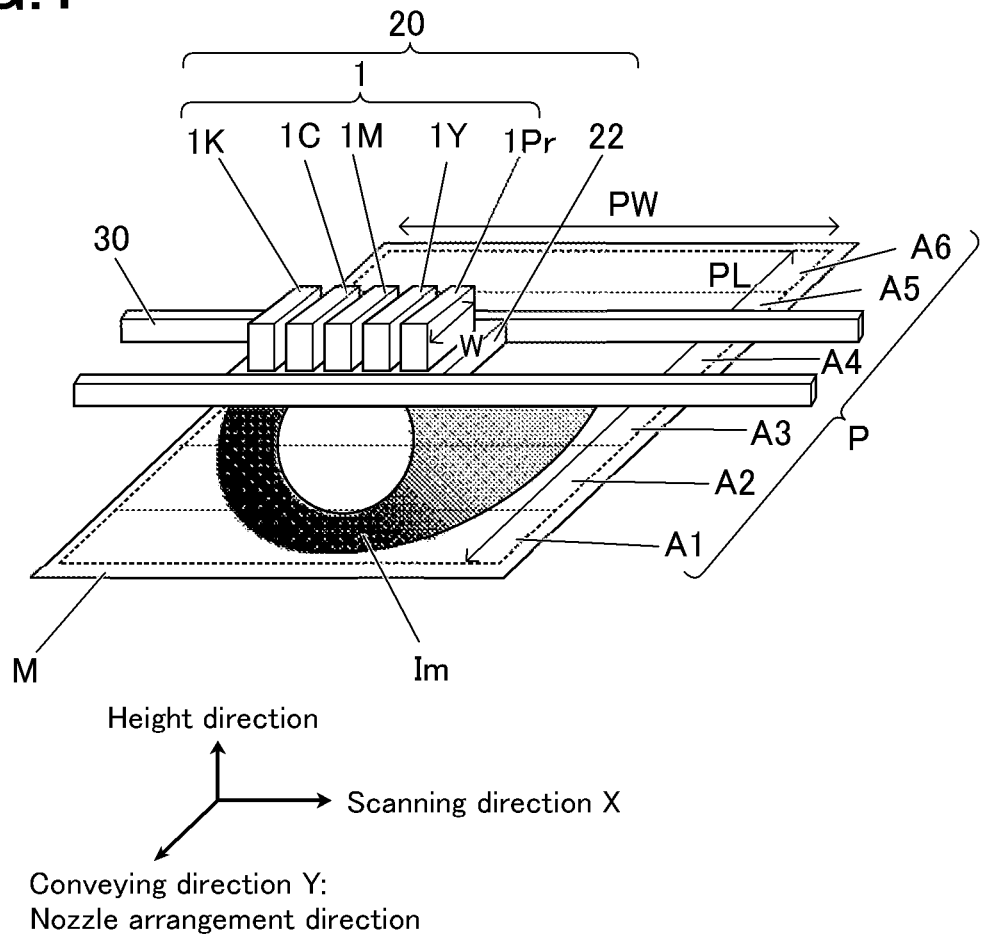
FIG. 1 is a diagram schematically illustrating an example of a main part of a two-liquid type inkjet recording apparatus to which the present invention is applicable.

Hereinafter, one or more embodiments of the present invention will be described. However, the scope of the invention is not limited to the disclosed embodiments.

The inkjet recording method according to the present invention is an inkjet recording method for forming an image by applying an ink containing at least a coloring material and a processing liquid containing at least a flocculant to a surface of a recording medium by a droplet discharge device, respectively, wherein the processing liquid is applied to an image forming region in which the image is formed and a peripheral region of the image forming region, and an application amount of the processing liquid to be applied to a peripheral region of the image forming region is controlled to be the same amount as the application amount of the processing liquid at an end portion of the image forming region. This feature is a common or corresponding technical feature in the embodiments described below.

As an embodiment of the present invention, from the viewpoint of expressing the effect of the present invention, it is preferable to control so that the processing liquid is not applied to the peripheral region of the end portion of the image forming region when the amount of the ink applied at the end portion of the image forming region is equal to or less than 15 $g/m^2$, in view of further expressing the target effect of the present invention.

In addition, it is preferable that the peripheral region of the image forming region is a region within the range of 0.030 to 0.150 mm outside an outer periphery of the image forming region starting from the outer periphery of the image forming region in view of being able to further accelerate the coalescence of the processing liquid and the ink and to form a sharp ink image in which color bleeding is more suppressed.

Further, it is preferable that the processing liquid contains a polyvalent metal salt or a solution cationic polymer as the flocculant.

Usually, when an organic acid is used, the pH is generally in the acidic range. Therefore, a resin such as an adhesive used in an inkjet head may be deteriorated, and inkjet head resistance may be inferior. The polyvalent metal salt is weakly alkaline from the neutral range in pH, and the pH may be adjusted to the neutral range by appropriately selecting the product number for the solution cationic polymer. Therefore, since the above problem may be solved, it is more preferable that the flocculant is a solution cationic polymer or a polyvalent metal salt.

In addition, it is preferable that the processing liquid does not contain resin fine particles in terms of more effective coalescence may be exhibited with respect to the ink. Since the processing liquid does not contain the resin fine particles, the processing liquid hardly increases in viscosity on the nozzle surface of the head by drying, which is preferable in that an effect of improving the ejection performance of the inkjet is exhibited.

It is preferable that the dynamic surface tension of the processing liquid is 35 mN/m or less at 25° C. and a lifetime of 50 ms, which is determined by the maximum bubble pressure method, in order to further develop the object effect of the present invention.

Further, the inkjet recording apparatus of the present invention is an inkjet recording apparatus for forming an image by applying ink containing at least a coloring material and a processing liquid containing at least a flocculant to a surface of a recording medium, respectively, by a droplet discharge device, and it is provided with at least droplet discharge device having a discharge port for discharging the ink and a discharge port for discharging the processing liquid. Wherein, the image forming apparatus includes a device for applying the processing liquid to an image forming region where the image is formed and a peripheral region of the image forming region, and controlling an application amount of the processing liquid to be applied to a peripheral region of the image forming region to be the same amount as an application amount of the processing liquid to be applied at an end portion of the image forming region.

Hereinafter, the present invention and the constitution elements thereof, as well as configurations and embodiments to carry out the present invention, will be detailed in the following. In the present description, when two figures are used to indicate a range of value before and after "to", these figures are included in the range as a lowest limit value and an upper limit value.

<<Inkjet Recording Method>>

The inkjet recording method of the present invention (hereinafter, also referred to as an inkjet method or simply a "recording method") is an inkjet recording method for forming an image by applying and merging an ink containing at least a coloring material and a processing liquid containing at least a flocculating agent on a surface of a recording medium by a droplet discharge device, wherein the processing liquid is applied to an image forming region in which the image is formed and a peripheral region of the image forming region, and an application amount of the processing liquid to be applied to a peripheral region of the image forming region is controlled to be the same amount as an application amount of the processing liquid at an end portion of the image forming region.

First, a basic configuration of an inkjet recording apparatus applicable to the recording method of the present invention will be described.

The recording method of the present invention is a so-called two-liquid type recording method in which an ink containing at least a coloring material and a processing liquid containing at least a flocculant are applied to a surface of a recording medium by a droplet discharge device, respectively, and an image is formed.

<<Inkjet Recording Apparatus>>

Figure 2:
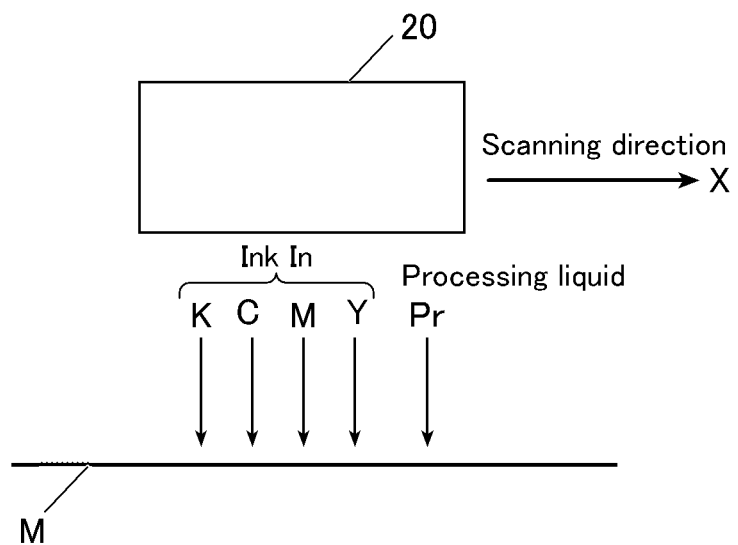
FIG. 2 is a diagram schematically showing a state in which an ink and a processing liquid are applied from a droplet discharge device to a surface of a recording medium by the method shown in FIG. 1.

An example of a main part of a two-liquid type inkjet recording apparatus (a scanning method, hereinafter, simply referred to as "recording apparatus") applicable to the recording method of the present invention is schematically shown in FIG. 1. FIG. 2 schematically shows a state in which the ink and the processing liquid are applied from a droplet discharge device to a surface of a recording medium by the apparatus shown in FIG. 1. Hereinafter, the recording method of the present invention will be described with reference to FIG. 1 and FIG. 2 by taking an example of image formation by a scanning method as an example, but the recording method of the present invention is not limited thereto. The present invention is also applicable to an inkjet recording apparatus of a line system, which will be described later.

In the recording method using the recording apparatus shown in FIG. 1, as shown in FIG. 2, the droplet discharge device 20 moves on the recording medium M in the scanning direction X (hereinafter also referred to as "X direction") while discharging the inks Y, M, C, and K (yellow, magenta, cyan, and black) of the respective colors and the processing liquid Pr, thereby forming an image. In the recording apparatus shown in FIG. 1, the recording medium M is sequentially conveyed in a direction Y orthogonal to the scanning direction X (hereinafter also referred to as "conveying direction Y" or "Y direction") by conveying device (not shown) so that an image may be formed on substantially the entire surface (image forming surface) of the recording medium M.

The droplet discharge device 20 has a head 1Pr for the processing liquid and heads 1Y, 1M, 1C, and 1K corresponding to the inks of the arrangement colors (hereinafter also referred to as "head unit 1"), and it has a carriage 22 for arranging and holding these heads along the scanning direction X.

A plurality of nozzles are arranged along a direction Y perpendicular to the scanning direction X on a surface (nozzle surface) of each head facing the surface of the recording medium M, and minute droplets are ejected from these nozzles by appropriately applying pressure to the ink and the processing liquid. The droplet discharge device 20 is supported in a state in which the nozzle surface of the head unit 1 is spaced apart from the surface at a predetermined distance in a direction (height direction) perpendicular to the surface of the recording medium M.

The droplet discharge device 20 is scanned in the scanning direction X by the scanning unit 30. The scanning unit 30 includes, for example, a rail that supports the carriage 22 in a state where the nozzle surface is spaced apart from the surface of the recording medium M at the above-described predetermined distance in the height direction, so that the carriage 22 may be moved along a rail extending along the scanning direction X.

FIG. 1 shows the entire print area P as a range in which an image is formed on the recording medium M by scanning the droplet discharge device 20 in the X direction and transporting the recording medium M in the Y direction. It is indicated that the length of the entire print area P in the X direction is the print area width PW, and it is indicated that the length in the Y direction is the print area length PL.

When the droplet discharge device 20 moves once in the scanning direction X, the inks Y, M, C, and K (hereinafter collectively referred to as "In") and the processing liquid Pr are applied in the region of the width PW of the printing region in the direction Y orthogonal to the scanning direction X of the head unit 1 with respect to the width PW of the entire print area P. In the recording method of the scanning method as shown in FIG. 1, a plurality of printing passes are performed in the same area and a desired image is finally formed on the recording medium M by performing a plurality of printing passes in the same area with the operation of applying the ink In and the processing liquid Pr to the recording medium M by one movement of the droplet discharge device 20 in the scanning direction X as a single printing pass.

Here, in the recording apparatus, the presence or absence of ink application and the amount of ink application are determined for each pixel area by the control unit according to the image data of the document, and an image is formed by applying ink to the surface of the recording medium M on the basis of the determination by the droplet discharge device. In some cases, image formation on the recording medium M is completed in one printing pass, but in the case of forming an image having a high resolution (dpi), image formation on the recording medium M is performed by decomposing the image and performing a plurality of printing passes.

In FIG. 1, an area in which the ink and the processing liquid are imparted by one movement of the droplet discharge device 20 is an area obtained by multiplying the print area width PW in the scanning direction X by the width W in the direction Y orthogonal to the scanning direction X of the head unit 1 (hereinafter, also referred to as "width W of the head unit 1").

The entire print area P is an aggregate of the print areas A. The number of print areas A constituting the entire print area P is represented by a value obtained by dividing the print area length PL by the width W of the head unit 1. For example, in the case of the recording medium M shown in FIG. 1, the number of the print areas A constituting the entire print area P is 6, and the print areas A1, A2, A3, A4, A5, and A6 are arranged in parallel in order from the front to the back of the recording medium M to constitute the entire print area P.

In FIG. 1, an image has already been formed in the print areas A1, A2, and A3 in the entire print area P. In the printing region A4, an image is being formed by the droplet discharge device 20, and after the image formation in the printing region A4 is completed, images are sequentially formed in the printing regions A5 and A6. In FIG. 1, Im denotes an image forming region.

In the recording method of the present invention, for example, the recording apparatus shown in FIG. 1 is used to form an image by applying the ink In and the processing liquid Pr to the surface of the recording medium M by the droplet discharge device 20 as described above. Although an embodiment in which the processing liquid Pr is applied to the surface of the recording medium M before the ink In is shown in FIG. 1 and FIG. 2, in the recording method of the present invention, the application of the processing liquid Pr may be performed after the ink In. For example, by arranging a head 1Pr for the processing liquid Pr after the head for ink, a configuration may be employed in which the processing liquid Pr is applied after the application of the ink In.

In the recording method of the present invention, it is preferable that the ink In and the processing liquid Pr are applied to an image forming region in which an image is formed, for example, a region indicated by Im in FIG. 1, so as to conform to the following control conditions (1) and (2).
(1) The application amount of the processing liquid is changed in accordance with the application amount of the ink for each unit area in which the images are formed, and the application amount of the processing liquid is controlled to be equal to or less than 5 g/m² in all of the unit areas.

(2) When an image is formed in a plurality of printing passes, in the unit area in which the application amount of the processing liquid is equal to or more than 0.8 g/m², an average value of the application amounts of the processing liquid in the unit area in each printing pass is controlled so that a deviation when compared between the printing passes is within ±30%.

In addition, when the droplet discharge device is a line type, the droplet discharge device has a length equal to or greater than the print area width PW of the entire print area P with respect to the recording medium M, and the head 1Pr for the processing liquid and the heads 1Y, 1M, 1C and 1K corresponding to the ink of each color are arranged in order along the conveying direction Y so as to be parallel to the print area width PW. The head 1Pr for the processing liquid may be disposed in front of or after the heads of the inks of the respective colors.

In the droplet discharge device of a line type, one head unit 1 (a set of the head 1Pr and the heads 1Y, 1M, 1C, and 1K) may be used to be equal to or larger than the print area width PW, or a plurality of head units 1 may be combined to be equal to or larger than the print area width PW.

Further, a plurality of head units 1 may be arranged so that the nozzles of each other are staggered, and the resolution of the droplet discharge device may be increased as a whole of the heads. In addition, a plurality of such droplet discharge devices may be arranged in parallel along the conveying direction Y of the recording medium. In this case, the number of printing passes according to the control condition (2) corresponds to the number of head units 1 arranged side by side along the conveying direction Y.

The system of each head is not particularly limited, and any one of the on-demand system and the continuous system may be used. Examples of on-demand heads include electro-mechanical conversion methods including single cavity type, double cavity type, bender type, piston type, share mode type and share wall type, as well as electrical-thermal conversion methods including thermal inkjet type and bubble jet type ("Bubble jet" is registered trademark of Canon Corporation).

Among the above heads, it is preferable to be a head using a piezoelectric element as an electro-mechanical conversion element used in the electro-mechanical conversion method (also referred to as a "piezo-type inkjet head").

<<Edge Processing>>

In the recording method of the present invention, the processing liquid is applied to an image forming region on which a recorded image is formed and a peripheral region of the image forming region, and an image is formed by controlling an application amount of the processing liquid to be applied to a peripheral region of the image forming region so as to be the same as an application amount of the processing liquid to be applied at an end portion of the image forming region. A specific method of the edge processing will be described later.

As an embodiment of the recording apparatus of the present invention, in view of expressing the effect of the present invention, the image forming region and the peripheral region of the image forming region on which the image is formed are provided with the processing liquid, and an application amount of the processing liquid to be applied to the peripheral region of the image forming region is controlled so as to be the same amount as an application amount of the processing liquid to be applied at an end portion of the image forming region.

Further, as described above, it is preferable that the processing liquid is not applied to the peripheral region of the end portion under a medium to low density condition in which the amount of the ink applied at the end portion of the image forming region is equal to or less than 15 g/m².

Figure 3:
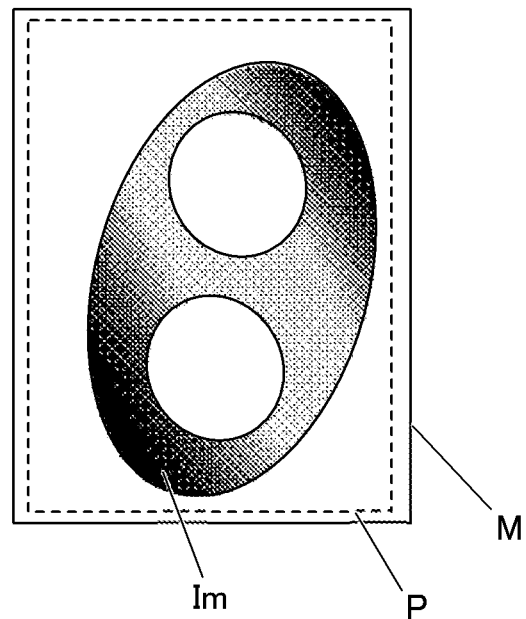
FIG. 3 is a view showing an example of a recording medium on which an image is formed by the recording method of the present invention using the recording apparatus of FIG. 1.

FIG. 3 shows an example of a recording medium on which an image is formed by the recording method of the present invention using the recording apparatus of FIG. 1. The image forming region Im shown in FIG. 3 corresponds to a document image. FIG. 3 shows a state in which image formation is completed for the recording medium M on which an image is being formed in FIG. 1. When an image is formed in the entire print area P on the surface of the recording medium M by the two-liquid type inkjet recording method, for example, in the case of an image of a document on a personal computer, the arrangement of pixels to which the ink In is applied and the application amount in the entire print area P are determined based on the image data subjected to the halftone processing, and the arrangement and the application amount of pixels to which the processing liquid Pr is applied are determined so as to correspond to the arrangement and the application amount.

In the example shown in FIG. 3, the ink In is applied to the image forming region Im on the recording medium M in accordance with the application position and the application amount determined based on the image data of the document. With respect to the processing liquid Pr, the application amount of the processing liquid is changed in accordance with the application amount of the ink in the image forming region Im, and the application amount of the processing liquid in all of the unit areas is controlled to be equal to or less than 5 g/m².

The present invention is characterized in that the processing liquid Pr is applied to the formed image shown in FIG. 3 not only in the image forming region but also in the peripheral region of the image forming region. Then, it is characterized in that an application amount of the processing liquid Pr applied to the peripheral region is the same amount as an application amount of the processing liquid Pr applied at the end portion of the image forming region adjacent to the peripheral region.

Figure 4:
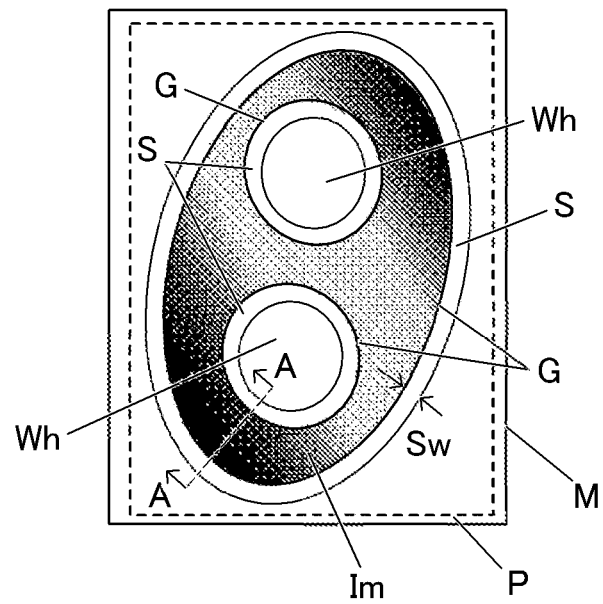
FIG. 4 is a diagram illustrating an example of a recording medium in which an image obtained by applying a processing liquid to the peripheral region is formed with respect to the image of FIG. 3.

FIG. 4 is a diagram showing another example of a recording medium on which an image is formed by the recording method of the present invention using the recording apparatus of FIG. 1. The image forming region Im shown in FIG. 4 corresponds to a document image formed using the same document image as the image forming region Im shown in FIG. 3. In the example shown in FIG. 4, the ink In is applied only to the image forming region Im on the recording medium M, and the processing liquid Pr is applied to both the image forming region Im and the peripheral region S of the image forming region Im.

In the example of FIG. 4, the ink In and the processing liquid Pr are given to the image formation region Im by the recording method of the present invention in the same manner as the example of FIG. 3. Then, the processing liquid Pr is also imparted to the peripheral region S. The application amount of the processing liquid Pr applied to the peripheral region S is set to be the same as the application amount of the processing liquid Pr applied to the end portion of the image forming region Im adjacent to the peripheral region S. As a result, an effect of suppressing the occurrence of ink bleeding in the vicinity of the boundary between the image forming region Im and the peripheral region S may be obtained.

For example, if the processing liquid Pr applied to the unit area is 2 g/m² at the end portion of the image forming region Im adjacent to the peripheral region S, the processing liquid Pr is applied at the application amount 2 g/m² in the peripheral region S. If the application amount of the processing liquid Pr in the peripheral region S is larger than the application amount of the processing liquid Pr to the end portion of the image forming region Im adjacent to the peripheral region S, cracking may occur in the ink coating film, and if it is small, bleeding of ink in the vicinity of the boundary between the image forming region Im and the peripheral region S may not be sufficiently suppressed. In the present invention, the "same amount" is treated as the "same amount" if it is within the error range of the applied amount caused by the performance of the recording apparatus such as the ejection performance of the processing liquid Pr in the head.

Incidentally, the bleeding of ink in the vicinity of the boundary between the image forming region Im and the peripheral region S tends to occur when the amount of the ink In applied at the end portion of the image forming region Im is large, and the effect of applying the processing liquid Pr to the peripheral region S is large. On the other hand, when the amount of the ink In applied at the end portion of the image forming region Im is small, if the processing liquid Pr is applied to the peripheral region S, the bleeding of the ink may occur in the vicinity of the boundary.

From this point of view, in the recording method of the present invention, when the amount of the ink In applied at the end portion of the image forming region Im is equal to or less than 15 g/m², more specifically, when the amount of ink In applied to the unit area U is equal to or less than 15 g/m² at the end portion of the image forming region Im, it is preferable to control the recording method so that the processing liquid Pr is not applied to the peripheral region S at the end portion.

The peripheral region S is preferably a region of 0.030 to 0.150 mm outside the end portion G starting from the end portion G of the image forming region Im. That is, the width Sw of the peripheral region S is preferably 0.030 to 0.150 mm.

It is to be noted that the end portion G of the image forming region Im indicates the contour of the image forming region Im, and when there is a blank region Wh inside which no image is formed as in the image forming region Im shown in FIG. 4, the boundary line between the blank region Wh and the image forming region Im is also regarded as the category of the end portion G. Here, when the image of the original is subjected to halftone processing to determine the arrangement of the pixels to which the inks In are to be applied, the end portion G of the image forming region Im may be detected as a border having large differences in the shading of the image by various methods (Sobel method, Laplacian of Gaussian method, Canny method, etc.) with respect to the image of the original prior to the halftone processing.

In the recording method of the present invention, after the ink In and the processing liquid Pr are applied to the surface of the recording medium and combined as described above, an image is usually formed by drying the combined liquid components to obtain an ink coating film. Drying may be performed by a known method depending on the composition and the amount of the ink In and the processing liquid Pr described below.

Figure 5A:
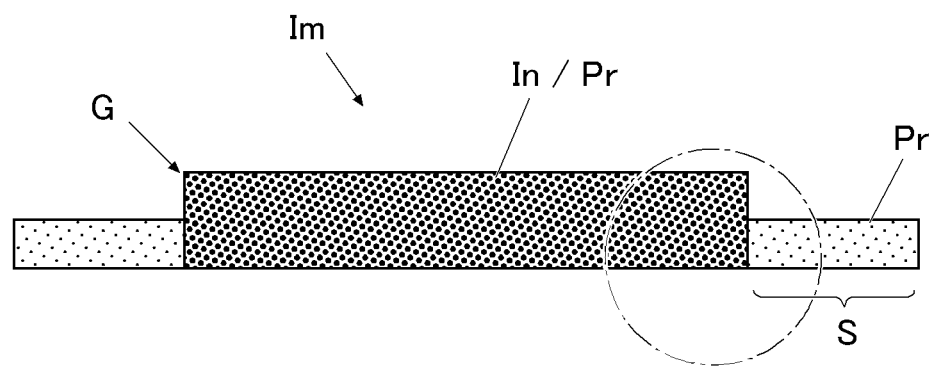
FIG. 5A is a cross-sectional view illustrating an example of a configuration in the A-A cut surface of the recording medium on which an image to which the processing liquid of FIG. 4 is applied is formed.
Figure 5B:
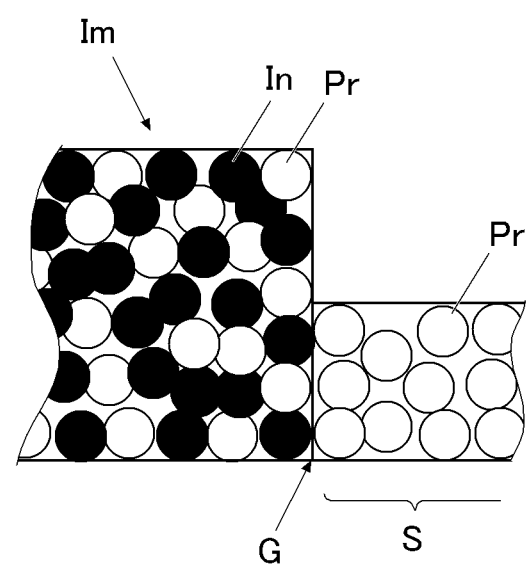
FIG. 5B is a cross-sectional view illustrating an example of a configuration in the A-A cut surface of the recording medium on which an image to which the processing liquid of FIG. 4 is applied is formed.

FIG. 5A and FIG. 5B show the inkjet image formed on the cut surface A-A and the application region of the processing liquid alone formed in the peripheral region thereof in the configuration shown in FIG. 4.

FIG. 5A is a cross-sectional view of an inkjet image according to the present invention, and FIG. 5B shows an example of an image configuration using the ink In and the processing liquid Pr.

As shown in FIGS. 5A and 5B, the image forming region Im of the inkjet image is configured as an aggregate of liquid droplets of the ink In and the processing liquid Pr. The peripheral region S of the image forming region Im is provided with the same amount of the processing liquid Pr as the amount of the processing liquid Pr applied at the end portion G of the image forming region Im.

Next, a processing method in the edge processing will be further described.

Figure 6:
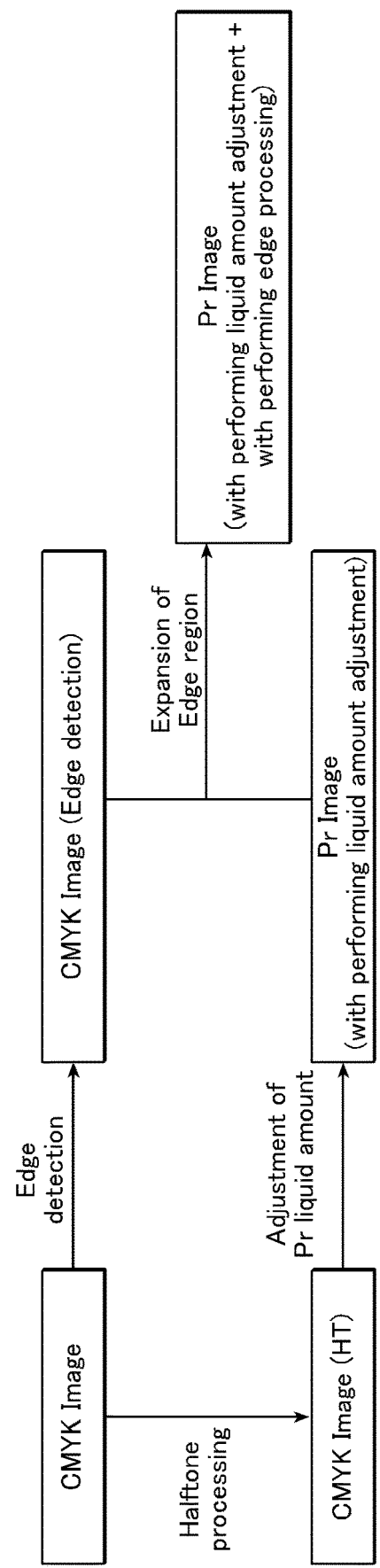
FIG. 6 is a flow diagram illustrating an example of edge processing.

FIG. 6 is a flow chart showing an example of edge processing in the recording method of the present invention.

[1] An image represented by RGB is displayed on a personal computer screen, for example. The RGB image is converted into a CMYK image by using commercially available image processing software, for example, Photoshop™.

[2] Halftone processing is performed on the produced CMYK image. The halftone processing is a method of expressing an image density as an area gradation such as a dot size and an area density formed by the ink, and may be performed by adapting a known error diffusion method or a dither method.

[3] Detecting edges of the CMYK image. With respect to CMYK image prior to the halftone processing, it is possible to detect edges of the image (portions having large differences in gray scale) by various methods (Sobel method, Laplacian of Gaussian method, and Canny method).

[4] Means for adjusting the amount of the processing liquid. Then, the amount of the processing liquid is adjusted by the following method.

(1) The application amount of the process liquid is changed in accordance with the application amount of the inks for each unit area in which the image is formed, and the application amount of the processing liquid is controlled to be equal to or less than 5 $g/m^2$ in all of the unit areas.

(2) When an image is formed in a plurality of printing passes, in the unit area in which the application amount of the processing liquid is equal to or more than 0.8 $g/m^2$, an average value of the application amounts of the processing liquid in the unit area in each printing pass is controlled so that a deviation when compared between the printing passes is within ±30%.

[5] Expansion of the edge region. In the edge processing of an image, a pixel address detected as an end portion in the image before halftone processing is recorded. From the pixels corresponding to the above-recorded pixel addresses of the liquid amount-adjusted processing liquid image, add a pixel to which the processing liquid is applied so as to expand the pixel in the specified range. At this time, the amount of the processing liquid applied in the range to be expanded is controlled so as to be the same as the amount of the processing liquid applied in the printing region.

[6] Addition of the processing liquid to the peripheral region. A new processing liquid pixel is arranged around the pixel of the processing liquid image corresponding to the edge detection portion of the CMYK image. It is possible to prevent ink bleeding of the end portion by this.

Here, when the amount of the processing liquid that protrudes from the ink printing region is larger than that of the ink printing region adjacent to the edge detection portion, cracking occurs in the ink coating film, and when the amount is small, bleeding of the ink cannot be sufficiently suppressed, resulting in deterioration of the image quality.

<<Method for Forming an Inkjet Image>>

In the inkjet recording method of the present invention (hereinafter, also referred to simply as "recording method"), an image is formed by applying an ink containing at least a coloring material and a processing liquid containing at least a flocculant to the surface of a recording medium by a droplet discharge device, respectively, to form an image, and at this time, it is preferable that the relationship between an application amount of the ink and an application amount of the processing liquid is controlled.

(1) The application amount of the process liquid is changed in accordance with the application amount of the inks for each unit area in which the image is formed, and the application amount of the processing liquid is controlled to be equal to or less than 5 $g/m^2$ in all of the unit areas.

(2) When an image is formed in a plurality of printing passes, in the unit area in which the application amount of the processing liquid is equal to or more than 0.8 $g/m^2$, an average value of the application amounts of the processing liquid in the unit area in each printing pass is controlled so that a deviation when compared between the printing passes is within ±30%.

In the recording method of the present invention, the amount of ink In applied to each pixel region is determined by a known method in accordance with image data of a document. In the recording method of the present invention, as described above, the relationship between the amount of ink In to be applied and the amount of the processing liquid Pr to be applied to the surface of the recording medium M is controlled as described above as described in the conditions (1) and (2).

In the above condition (1), the application amount of the processing liquid Pr is controlled so as to vary according to the application amount of the ink In for each unit area in which an image is formed. However, the application amount of the processing liquid Pr is controlled so that the application amount of the processing liquid Pr becomes equal to or less than 5 $g/m^2$ in all of the unit areas in which the images are formed.

The size of the unit area in which the image is formed (hereinafter also referred to as "unit area U") is appropriately selected within a range in which the effect of the present invention may be exhibited. Specifically, one pixel may be a unit area U. Since the effect of the present invention may be easily exhibited, it is preferable that the unit area U has four or more pixels as one unit. Furthermore, it is more preferable that the unit area U is of 4 pixels composed of 2 vertical pixels×2 horizontal pixels, 16 pixels composed of 4 vertical pixels×4 horizontal pixels, and 36 pixels composed of 6 vertical pixels×6 horizontal pixels.

<<Materials for Forming Inkjet Image>>

Next, an ink In containing at least a coloring material and a processing liquid Pr containing at least a flocculant used in the recording method of the present invention will be described.

[Ink]

The ink In according to the present invention contains at least a coloring material. As the coloring material, a pigment is preferred. It is preferable that the ink In contains, for example, a pigment as a coloring material, a polymer dispersant and a resin fine particle for dispersing the pigment, and water and an organic solvent as a medium.

(Coloring Material)

As the coloring material contained in the ink according to the present invention, it is preferable to be a pigment, and as a pigment applicable to the present invention, an anionic dispersing pigment, for example, an anionic self-dispersing pigment or a pigment dispersed with an anionic polymer dispersant may be used. In particular, it is suitable to apply a pigment dispersion in which a pigment is dispersed by an anionic polymer dispersant.

As the pigment, conventionally known ones may be used without any particular limitation, and for example, an organic pigment such as an insoluble pigment or a lake pigment, and an inorganic pigment such as titanium oxide may be preferably used.

It is to be noted that, in titanium oxide which is generally difficult to ensure ink ejection stability and adhesion, it is possible to particularly preferably prevent bleeding and improve adhesion according to the present invention.

Titanium oxide has three crystal forms: anatase, rutile, and perovskite, but it may be broadly classified into anatase and rutile forms for general purposes. Although not particularly limited, a rutile type having a large refractive index and high hiding property is preferred. Specific examples include the TR series of Fuji Titanium Industry Co., Ltd., the JR series of Tayca Corporation, and TIPAQUE™ of Ishihara Sangyo Kaisha, Ltd.

The insoluble pigment is not particularly limited, and for example, azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, and diketopyrrolopyrrole are preferable.

Specific organic pigments which may be preferably used include the following pigments.

Pigments for magenta or red include, for example, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment 144, C.I. Pigment 149, C.I. Pigment 166, C.I. Pigment 178, C.I. Pigment Red 222, and C.I. Pigment Violet 19.

Pigments for orange or yellow include, for example, C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 15:3, C. I. Pigment Yellow 17, C. I. Pigment Yellow 74, C. I. Pigment Yellow 93, C. I. Pigment Yellow 128, C. I. Pigment Yellow 94, C. I. Pigment 138, and C. I. Pigment Yellow 155. In particular, C.I. Pigment Yellow 155 is preferred in the balance of color tone and light resistance.

Pigments for green or cyan include, for example, C.I. Pigment Blue 15, C.I. Pigment Blue 15:2, C.I. Pigment Blue 15:3, C.I. Pigment Blue 16, C.I. Pigment Blue 60, and C.I. Pigment Green 7.

Further, examples of the pigment for black include C.I. Pigment Black 1, C.I. Pigment Black 6, and C.I. Pigment Black 7.

(Polymer Dispersant)

The polymer dispersant used for dispersing the pigment is not particularly limited, but a polymer dispersant having an anionic group is preferred, and a polymer dispersant having a molecular weight within a range of 5000 to 200000 may be suitably used.

Examples of the polymer dispersant include a block copolymer having a structure derived from 2 or more monomers selected from styrene, styrene derivative, vinylnaphthalene derivative, acrylic acid, acrylic acid derivative, maleic acid, maleic acid derivative, itaconic acid, itaconic acid derivative, fumaric acid, and fumaric acid derivative, a random copolymer and a salt thereof, a polyoxyalkylene, and a polyoxyalkylene alkyl ether.

The polymer dispersant preferably has an acryloyl group, and is preferably added by neutralizing with a neutralizing agent (neutralizing base). Here, the neutralizing base is not particularly limited, but is preferably an organic base such as ammonia, monoethanolamine, diethanolamine, N-methylethanolamine, N-methyldiethanolamine, triethanolamine, or morpholine. In particular, when the pigment is titanium oxide, it is preferable that titanium oxide is dispersed with a polymer dispersant having an acryloyl group.

As the polymer dispersant, a commercially available product may be used. Examples of the commercially available product of the polymer dispersant include Joncryl™ 819 manufactured by BASF Co., Ltd.

Further, the amount of the polymer dispersant added is preferably within a range of 10 to 100% by mass, more preferably within a range of 10 to 40% by mass, based on the pigment.

As the pigment, it is also preferable to have a so-called capsule pigment form in which the pigment particle surface is coated with the above polymer dispersant. As a method of coating the pigment with a polymer dispersant, various known methods may be used, and examples thereof include a phase inversion emulsification method, an acid precipitation method, or a method in which a pigment is dispersed by a polymerizable surfactant, and a monomer is supplied thereto and coated while being polymerized may be preferably exemplified.

As a particularly preferred method, a method may be mentioned in which a water-insoluble resin is dissolved in an organic solvent such as methyl ethyl ketone, and further, an acidic group in the resin is partially or completely neutralized with a base, and then a pigment and ion-exchanged water are added and dispersed, and then the organic solvent is removed and, if necessary, water is added to prepare the solution.

The average particle diameter of the pigment dispersed in the ink is preferably 50 nm or more and less than 200 nm. Thus, dispersion stability of the pigment may be improved, and storage stability of the ink may be improved. The particle size of the pigment may be measured by a commercially available particle size measuring instrument using a dynamic light scattering method, or an electrophoresis method, but the measurement by a dynamic light scattering method is simple and the particle size region may be measured with high accuracy.

The pigment may be dispersed and used by a disperser together with a dispersant and other necessary additives depending on various desired objects.

As the disperser, conventionally known dispersion apparatus, for example, ball mill, sand mill, line mill, high-pressure homogenizer may be used. Among them, when the pigment is dispersed by a sand mill, the particle size distribution becomes sharp, which is preferable. Further, the material of the beads used in the sand mill disperse is not particularly limited, but is preferably zirconia or zircon from the viewpoint of preventing generation of bead debris and contamination of the ionic component. Moreover, this bead diameter is preferably within a range of 0.3 to 3.0 mm.

Although the content of the pigment in the ink is not particularly limited, for titanium oxide, the content is preferably within a range of 7 to 18% by mass, and for the organic pigment, the content is preferably within a range of 0.5 to 7% by mass.

(Resin Particles)

The resin fine particles used in the ink according to the present invention are preferably water-insoluble resin fine particles. The water-insoluble resin fine particles used in the present invention are fine particle dispersions of a water-insoluble resin which may receive an ink and exhibit solubility or affinity for the ink.

As described above, the water-insoluble resin fine particles are those which are inherently water-insoluble, but have a form in which a resin is dispersed in an aqueous medium as micro fine particles, and which are forcibly emulsified using an emulsifier and dispersed in water, or a water-insoluble resin which may be self-emulsified by itself without using an emulsifier or a dispersion stabilizer by introducing a hydrophilic functional group into the molecular. These resins are usually used in an emulsion-dispersed state in water or a water/alcohol mixed solvent.

As the resin used, at least, it is preferable to be a polyester-based resin, a polyurethane-based resin, a polyacrylic resin or a composite resin fine particle of a polyurethane-based resin and a polyacrylic resin.

As for the composite resin fine particles of the polyester-based resin, the polyurethane-based resin, the polyacrylic resin or the polyurethane-based resin and the polyacrylic-based resin, those described in detail in the section of the processing liquid described later are preferably used as appropriate, but the resin fine particles used in the processing liquid are preferably cationic or nonionic in ionic properties, whereas the resin fine particles used in the ink are preferably anionic.

Among them, the resin fine particles used in the ink preferably contain an acid structure, and even if the amount of the surfactant added is small, it becomes possible to disperse them in water, thereby improving the water resistance of the formed ink image. This is referred to as a self-emulsifying type, and means that a urethane-based resin may be dispersed and stabilized in water only by molecular ionicity without using a surfactant. Examples of acid structures include acid groups such as a carboxy group (—COOH) and a sulfonic acid group (—$SO_3H$). The acid structure may be present in the side chain in the resin and may be present at the terminal.

It is preferable that a part or all of the above acid structure is neutralized. By neutralizing the acid structure, water dispersibility of the resin may be improved. As an example of a neutralizing agent which neutralizes the acid structure, an organic amine is preferable, and for example, an organic amine such as trimethylamine, triethylamine, tripropylamine, tributylamine, N-methyldiethanolamine, or triethanolamine is preferably used.

As the resin fine particles used in the ink, a commercially available product may be used. Examples of the commercially available product of resin fine particles are listed below according to the type of resin.
<Polyester Resin>
Pesresin™ A-110F, A-520, A-613D, A-615GE, A-640, A-645GH, A-647GEX manufactured by Takamatsu Oil & Fat Co., Ltd.; and Elitel™ KA-5034, KA-5071S, KA-1449, KA-0134, KA-3556, KA-6137, KZA-6034, KT-8803, KT-8701, KT-9204, KT-8904, KT-0507, KT-9511 manufactured by Unitika Co., Ltd.
<Urethane Resin>
NeoRez™ R-967, R-600, R-9671 manufactured by Kusumoto Chemicals, Ltd.; and W-6061, W-5661, WS-4000 manufactured by Mitsui Chemicals Co., Ltd.
<Acrylic Resin>
NeoCryl™ A-1127 manufactured by Kusumoto Chemicals, Ltd.; Movinyl™ 6899D, 6696D, 6800, 6810 manufactured by Japan Coating Resin Co., Ltd.; and TOCRYL™ W-7146, W-7150, W-7152 manufactured by Toyochem Co., Ltd.

The content of the resin fine particles in the ink is not particularly limited, but is preferably within a range of 2 to 10% by mass, and more preferably within a range of 2 to 5% by mass.
(Organic Solvents)
As the organic solvent contained in the ink, a water-soluble organic solvent may be suitably used. Examples of the water-soluble organic solvent include alcohols, polyhydric alcohols, amines, amides, glycol ethers, and 1,2-alkanediols having 4 or more carbon atoms.
<Alcohols>
Examples of the alcohol include methanol, ethanol, 1-propanol, 2-propanol, 1-butanol, 2-butanol, 2-methyl-1-propanol, t-butanol, 3-methoxy-1 butanol, 3-methoxy-3-methylbutanol, 1-octanol, 2-octanol, n-nonyl alcohol, tridecyl alcohol, n-undecyl alcohol, stearyl alcohol, oleyl alcohol, and benzyl alcohol.
(Polyhydric Alcohols)
Examples of the polyhydric alcohol include ethylene glycol, diethylene glycol, triethylene glycol, tetraethylene glycol, and polyethylene glycol having 5 or more number of ethylene oxide groups, propylene glycol, dipropylene glycol, tripropylene glycol, polypropylene glycol having 4 or more number of propylene oxide groups, butylene glycol, hexanediol, pentanediol, Glycerin, hexanetriol, and thiodiglycol.
<Amines>
Examples of the amine include ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine.
<Amides>
Examples of the amide include formamide, N,N-dimethylformamide, and N,N-dimethylacetamide.
<Glycol Ethers>
Examples of the glycol ether include ethylene glycol monoethyl ether, ethylene glycol monobutyl ether, diethylene glycol monoethyl ether, diethylene glycol monobutyl ether, triethylene glycol monobutyl ether, propylene glycol monopropyl ether, dipropylene glycol monomethyl ether, and tripropylene glycol monomethyl ether.
<1,2-Alkandiols Having 4 or More Carbon Atoms>
Examples of the 1,2-alkanediol having 4 or more carbon atoms include 1,2-butanediol, 1,2-pentanediol, 1,2-hexanediol, and 1,2-heptanediol.

Particularly preferably used organic solvents are polyhydric alcohols, and bleeding during high-speed printing may be suitably suppressed. Specifically, ethylene glycol, diethylene glycol, triethylene glycol, tetraethylene glycol, propylene glycol, dipropylene glycol, and tripropylene glycol are preferred.

The ink may contain 1 or 2 or more kinds selected from these organic solvents in combination.

The content of the organic solvent in the ink is not particularly limited, but is preferably within a range of 10 to 60% by mass.
(Water)
The water contained in the ink according to the present invention is not particularly limited, and may be ion-exchanged water, distilled water, or pure water. The content of water in the ink is not particularly limited, but is preferably within a range of 45 to 85% by mass
(Other Additives)
The ink according to the present invention may contain various known additives, if necessary, depending on the purpose of improving the surfactant property, the injection stability, the print head and the ink cartridge compatibility, the storage stability, the image storage property, and other various performances.

<Surfactant>

In the ink according to the present invention, it is preferable to contain a surfactant, whereby the stability of ejection of the ink from the nozzles may be improved, and the spread of the ink droplets landed on the recording medium (enlargement of the dot diameter) may be controlled.

The surfactant which may be used in the ink according to the present invention may be used without any particular limitation, but when an anionic compound is contained in other constituent components of the ink, the ionic property of the surfactant is preferable an anion, a nonion or a betaine type.

In the present invention, a fluorine-based or silicone-based surfactant having a high ability of lowering a static surface tension, or an anionic surfactant such as dioctyl sulfosuccinate having a high ability of reducing a dynamic surface tension, a polyoxyethylene alkyl ether having a relatively low molecular weight, a polyoxyethylene alkyl phenyl ether, an acetylene glycol, a pluronic type surfactant (Pluronic™ is a registered trademark), or a nonionic surfactant such as a sorbitan derivative is preferably used. It is also preferable to use a fluorine-based or silicone-based surfactant in combination with a surfactant having a high ability of reducing dynamic surface tension.

By adding a silicone-based or fluorine-based surfactant as a surfactant, ink mixing (beading) may be further suppressed for a recording medium made of various hydrophobic resins including a vinyl chloride sheet or a recording medium having a low ink absorbing ability such as a printed paper, which is preferable in that a high image quality printing image may be obtained.

As the above-mentioned silicone-based surfactant, there is preferably a polyether-modified polysiloxane compound, and examples thereof include KF-351A, KF-642 manufactured by Shin-Etsu Chemical Co., Ltd., BYK345, BYK347, BYK348 manufactured by BYK Chemie, and Tegowet™ 260 manufactured by Evonik Industries.

The above-mentioned fluorine-based surfactant means that a part or all of which is substituted with fluorine instead of hydrogen bonded to carbon of a hydrophobic group of an ordinary surfactant. Of these, those having a perfluoroalkyl group in the molecular are preferred.

Among the above-mentioned fluorinated surfactants, some are commercially available under the trade name Megafac™ F from DIC Corporation, under the trade name Surflon™ from AGC Inc., under the trade name Fluorad™ FC from 3M Company, under the trade name Monflor™ from Imperial Chemical Industry, under the trade name Zonyls™ from DuPont Nemeours, Inc., and under the trade name Licowet™ VPF from Farbwerke Hoechist AG.

The content of the surfactant in the ink is not particularly limited, but is preferably within a range of 0.1 to 5.0% by mass of the total mass of the ink.

In the ink used in the present invention, various well-known additives, for example, polysaccharides, viscosity adjusting agents, resistivity adjusting agents, film forming agents, UV absorbers, antioxidants, anti-fading agents, and anti-rust agents may be appropriately selected according to the purpose of improving the ejection stability, the compatibility with the print head and the ink cartridge, the storage stability, the image storage property, and other various performances. Examples thereof include fine particles of oil droplets of liquid paraffin, dioctylphthalate, tricresyl phosphate, and silicone oil; UV absorbers described in JP-A Nos. 57-74193, 57-87988, and 62-261476, 1975, and 1975-1491; anti-fading agents described in JP-A Nos. 57-74192, 57-87989, 60-72785, 61-146591, 1-95091, and 3-13376; and fluorescent whitening agents described in JP-A Nos. 59-42993, 59-52689, 62-28069, 61-242871, and 4-219266.

The ink In used in the present invention preferably has a viscosity of 1 to 40 mPa·s at 25° C., and more preferably 2 to 10 mPa·s. The viscosity of the ink In may be measured with a rotary viscometer. Unless otherwise specified, the viscosity in this specification is a viscosity at 25° C.

Further, it is preferable that the static surface tension of the ink In at 25° C. is larger than that of the processing liquid Pr. The static surface tension of the ink In is preferably in the range of 25 to 33 mN/m at 25° C., more preferably in the range of 25 to 29 mN/m. The static surface tension of the ink In may be measured by a surface tension meter using a platinum plate method (Wilhelmy method). The static surface tension in this specification is the static surface tension at 25° C. unless otherwise specified.

[Processing Liquid]

The processing liquid Pr to be applied to the inkjet recording method of the present invention contains at least a flocculant. The viscosity of the processing liquid Pr is adjusted by adding a solvent so as to be ejectable from the nozzles on the head 1Pr by an inkjet method. The processing liquid Pr contains a flocculant as an essential component, and further contains water, an organic solvent and a surfactant as a basic component. Further, it is preferable that the processing liquid Pr does not contain resin fine particles.

The viscosity of the processing liquid Pr is preferably within a range of 1 to 40 mPa·s at 25° C., more preferably within a range of 1 to 10 mPa·s.

The static surface tension of the processing liquid Pr at 25° C. is preferably smaller than the static surface tension of the ink In. The static surface tension of the processing liquid Pr is preferably within a range of 22 to 30 mN/m at 25° C., more preferably within a range of 22 to 26 mN/m.

The dynamic surface tension of the treatment solution Pr is preferably 40 mN/m or less at 25° C. and 50 ms, more preferably 36 mN/m or less, and still more preferably 25 to 35 mN/m. The dynamic surface tension of the treatment liquid Pr was determined as a value at 25° C. and the life time of 50 ms when bubbles are continuously generated using the Dynamic Surface Tension Meter BP-D4 type manufactured by Kyowa Interface Science Co., Ltd. Unless otherwise specified, the dynamic surface tension herein is a value measured at 25° C. and 50 ms using the maximum bubble pressure method.

(Flocculant)

In the processing liquid according to the present invention, a material having a function of causing an aggregate when combined with an ink containing a coloring material, that is, a flocculant is contained, so that an interaction when combined with an ink becomes large, and a dot of an ink is immobilized to suppress an enlargement of a dot diameter. Note that the flocculant may be selected according to the type of the coloring material contained in the ink.

The flocculant preferably contains any of a solution cationic polymer, an organic acid or a polyvalent metal salt, and more preferably a solution cationic polymer or a polyvalent metal salt.

The above-mentioned solution cationic polymer and polyvalent metal salt may agglomerate an anionic component (usually a coloring material or a pigment) in the above-mentioned ink by salting out. The above organic acid has a function of aggregating an anionic component in the above ink by pH variation.

Examples of the above-mentioned solution cationic polymers include polyallylamine, polyvinylamine, polyethyleneimine and polydiallyldimethylammonium chloride. Examples of the commercially available product of the solution cationic polymer include KHE100L, FPA100L manufactured by Senka Corporation, and PAS-92A, PAS-M-1A, PAS-21CL manufactured by Nittobo Medical Co., Ltd.

The above organic acid is one capable of aggregating a pigment which may be contained in an ink, and preferably has a first dissociation constant of 3.5 or less, and preferably within a range of 1.5 to 3.5. When the first dissociation constant is within the above range, liquid deviation in the low density portion of a low printing ratio is further prevented, and beading in the high density portion having a high printing ratio is further improved.

Further, by using an organic acid, the storage stability of the processing liquid is easily maintained, and blocking is hardly caused after the processing liquid is applied and dried. Preferred organic acids from the above viewpoint include formic acid, acetic acid, propionic acid, isobutyric acid, oxalic acid, fumaric acid, malic acid, citric acid, malonic acid, succinic acid, maleic acid, benzoic acid, 2-pyrrolidone-5-carboxylic acid, lactic acid, acrylic acid and derivatives thereof, methacrylic acid and derivatives thereof, compounds having carboxy groups including acrylamide and derivatives thereof, sulfonic acid derivatives, phosphoric acid and derivatives thereof.

The content of the organic acid in the processing liquid Pr may be any amount that adjusts the pH of the processing liquid to less than the first dissociation constant of the organic acid. By including an amount of an organic acid in which the pH of the processing liquid becomes lower than the first dissociation constant of the organic acid in the processing liquid, bleeding at the time of high-speed printing may be effectively suppressed.

Examples of the above polyvalent metal salt include water-soluble salts such as calcium salts, magnesium salts, aluminum salts and zinc salts. Examples of the compound which forms a salt with the polyvalent metal include hydrochloric acid, bromic acid, hydroiodic acid, sulfuric acid, nitric acid, phosphoric acid, thiocyanic acid, and organic carboxylic acids such as acetic acid, oxalic acid, lactic acid, fumaric acid, fumaric acid, citric acid, salicylic acid, and benzoic acid, and organic sulfonic acid.

The flocculant is preferably contained in a range of 5% by mass or less based on the processing liquid, and it is preferable to contain the flocculant within a range of 1 to 4% by mass from the viewpoint of effectively aggregating the anionic component in the ink and balancing the image quality and the hot water resistance.

The content of the flocculant in the processing liquid Pr may be measured by a known method. For example, the content may be measured by ICP emission spectrometry when the flocculant is a polyvalent metal salt, and by high performance liquid chromatography (HPLC) when the flocculant is an acid.

(Water, Organic Solvent and Surfactant)

The water contained in the processing liquid Pr according to the present invention is not particularly limited, and may be ion-exchanged water, distilled water, or pure water. The content of water in the processing liquid Pr is not particularly limited, but is preferably within a range of 45 to 80% by mass.

Further, as a solvent of the processing liquid Pr according to the present invention, an organic solvent may be contained in addition to water. As the organic solvent, the same organic solvent as exemplified in the above ink In may be used. The content of the organic solvent in the processing liquid Pr is not particularly limited, but is preferably within a range of 10 to 50% by mass.

The processing liquid Pr according to the present invention may contain a surfactant. As the surfactant, the same surfactant as exemplified in the above ink In may be used. The content of the surfactant in the processing liquid Pr is not particularly limited, but is preferably within a range of 0.08 to 3% by mass.

In addition, other components such as a crosslinking agent, an anti-mold agent, and a fungicide may be appropriately blended in the processing liquid within a range not impairing the effect of the present invention.

Further, for example, the following may be contained: ultraviolet absorbers described in JP-A Nos. 57-74193, 57-87988 and 62-261476; anti-fading agents described in JP-A Nos. 57-74192, 57-87989, 60-72785, 61-146591, 1-95091, and 3-13376; various anionic, cationic or nonionic surfactants; fluorescent whitening agents described in JP-A Nos. 59-42993, 59-52689, 62-280069, 61-242871 and 4-219266; and various known additives such as anti-foaming agents, lubricants such as diethylene glycol, preservatives, thickener, and antistatic agents.

[Recording Medium]

The recording medium which may be used in the present invention is not particularly limited, but is preferably a recording medium made of a non-absorbent material (hereinafter also referred to as "non-absorbent recording medium"). By using a non-absorbent recording medium, the effect of the present invention is more remarkable. In the present invention, "non-absorbent" represents "non-absorbent to water".

As an example of the non-absorbent recording medium, a film of a known plastic may be used. Specific examples thereof include polyester films such as polyethylene terephthalate, polyethylene films, polypropylene films, polyamide-based films such as nylon, polystyrene films, polyvinyl chloride films, polycarbonate films, polyacrylonitrile films, and biodegradable films such as polylactic acid films. In addition, in order to impart gas barrier property, moisture barrier property, and flavor retention, a film obtained by coating one or both sides of a film with polyvinylidene chloride or a film obtained by vapor-depositing a metal oxide may be preferably used. The non-absorbent film may be preferably used either as an unstretched film or as a stretched film.

In addition to these, a recording medium made of an inorganic compound such as a metal or glass may be mentioned as a non-absorbent recording medium.

Leather may also be used. Leather used in printing applications is typically cowhide. However, since the cowhide does not have durability as it is, it is preferable to perform tanning with chromium. It is common for tanned leather to be coated with an acrylic or urethane-based white pigment coating to form a recording medium.

Further, a packaging material for retort food may be suitably used in which a thermosetting resin is provided as a coating layer on a metal recording medium. In order to block air, moisture and light and seal the food inside, the packaging material for retort food is, for example, composed of a film in which a thermoplastic resin layer and an aluminum foil layer are laminated to seal the material. It is composed of a polypropylene film on the food side and a polyester film on the outside to block air, moisture and light and seal the food inside.

In the present invention, the thickness of the recording medium is within a range of 10 to 120 μm, more preferably 12 to 60 μm, as long as it is a film base material. Also, if it is a metal substrate, it is within a range of 0.05 to 0.5 mm, more preferably 0.1 to 0.3 mm. Further, it is preferable that the leather base material is within a range of 1 to 5 mm, more preferably 1 to 3 mm.

EXAMPLES

Hereinafter, the present invention will be specifically described with reference to Examples, but the present invention is not limited thereto. In the examples, "parts" or "%" is used, but unless otherwise specified, it represents "parts by mass" or "% by mass". Further, "% by mass" may de indicated as "mass %".

[Preparation of Ink Set A]
(Preparation of Cyan ink)

Each of the constituent materials listed in Table I was mixed to prepare a cyan ink. Pigment Blue 15:3 was used as the cyan pigment, and as a pigment dispersant, an acrylic dispersant having a neutralized carboxy group ("Joncryl™ 819" manufactured by BASF Co., Ltd., acid value 75 mgKOH/g, solid content 20 mass %), propylene glycol as an ink solvent, and ion-exchanged water in a predetermined amount were premixed. Then the mixture was dispersed using a sand grinder in which 0.5 mm zirconia beads were filled with 50% by volume to prepare a cyan pigment dispersion having a cyan pigment content of 18% by mass. The average particle diameter of the pigment particles contained in this pigment dispersion was 110 mm. At the time of ink configuration, the cyan pigment dispersion was used so that the cyan pigment became 5.0% by mass as a solid content.

As a result of measuring the viscosity of the cyan ink at 25° C. by a rotary viscometer, it was 5.12 mPa/s. The static surface tension of the cyan ink at 25° C. was measured by a platinum plate method (Wilhelmy method) and found to be 28.7 mN/m.

TABLE I

| | Cyan ink | | Content (mass %) |
|---|---|---|---|
| Constituent material | Cyan pigment | Pigment Blue 15:3 | 5.0 |
| | Dispersing resin | Joncryl 819 (BASF) | 2.0 |
| | Neutralizing agent for dispersant | N-Methyldiethanolamine | 0.4 |
| | Resin fine particles | NeoCryl A-1127 (Kusumoto Chemicals) | 5.0 |
| | Ink solvent | Propylene glycol | 30.0 |
| | Surfactant | KF-351A (Shin-Etsu Chemical) | 0.5 |
| | | Ion-exchanged water | *1 |

*1: Amount to be 100 mass % in total (Preparation of Yellow Ink, Magenta Ink and Black Ink)

A yellow ink, a magenta ink and a black ink were prepared in the same manner as the preparation of the cyan ink except that C.I. Pigment Yellow 155 as a yellow pigment, C.I. Pigment Red 202/Pigment Violet 19 as a magenta pigment, and Pigment Black 7 as a black pigment, respectively, were used instead of Pigment Blue 15:3 which is a cyan pigment in the preparation of the cyan ink.

(Preparation of Ink Set A)

An ink set A composed of the above prepared cyan ink, yellow ink, magenta ink and black ink was prepared.

[Preparation of Processing Liquids A to C]

The polyvalent metal salt (calcium acetate), the ink solvent (propylene glycol), the surfactant, and the ion-exchanged water described in Table II were sequentially added with stirring, and then filtered through a filter of 5.0 μm to obtain processing liquids A, B, and C. There was no substantial compositional change before and after filtration.

The static surface tension and the dynamic surface tension of each of the above-prepared processing liquids are as follows.

Processing liquid A: viscosity=4.89 mPa·s, static surface tension=28.8 mN/m, dynamic surface tension=38.3 mN/m
Processing liquid B: viscosity=5.02 mPa·s, static surface tension=26.7 mN/m, dynamic surface tension=35.6 mN/m
Processing liquid C: viscosity=5.09 mPa·s, static surface tension=25.5 mN/m, dynamic surface tension=32.1 mN/m The viscosities and static surface tensions were measured by the method described above, and the dynamic surface tensions were measured by the maximum-pressure method at 25° C. using a Dynamic Surface Tension Meter BP-D4 type manufactured by Kyowa Interface Science Co., Ltd. The dynamic surface tension was determined as a value at a lifetime of 50 milliseconds when bubbles were continuously generated.

TABLE II

| | | | A | B | C |
|---|---|---|---|---|---|
| | Processing liquid type | | Content (mass %) | | |
| Constituent material | Polyvalent metal salt | Calcium acetate | 3.0 | 3.0 | 3.0 |
| | Ink solvent | Propylene glycol | 30.0 | 30.0 | 30.0 |
| | Surfactant | KF-351A (Shin-Etsu Chemical) | 0.5 | 1.0 | — |
| | | Tegowet 260 (*2) | — | — | 1.0 |
| | Ion-exchanged water | | *1 | *1 | *1 |

(*2): manufactured by Evonik Industries
*1: Amount to be 100 mass % in total

<<Formation of Inkjet Images>>

Figure 7:
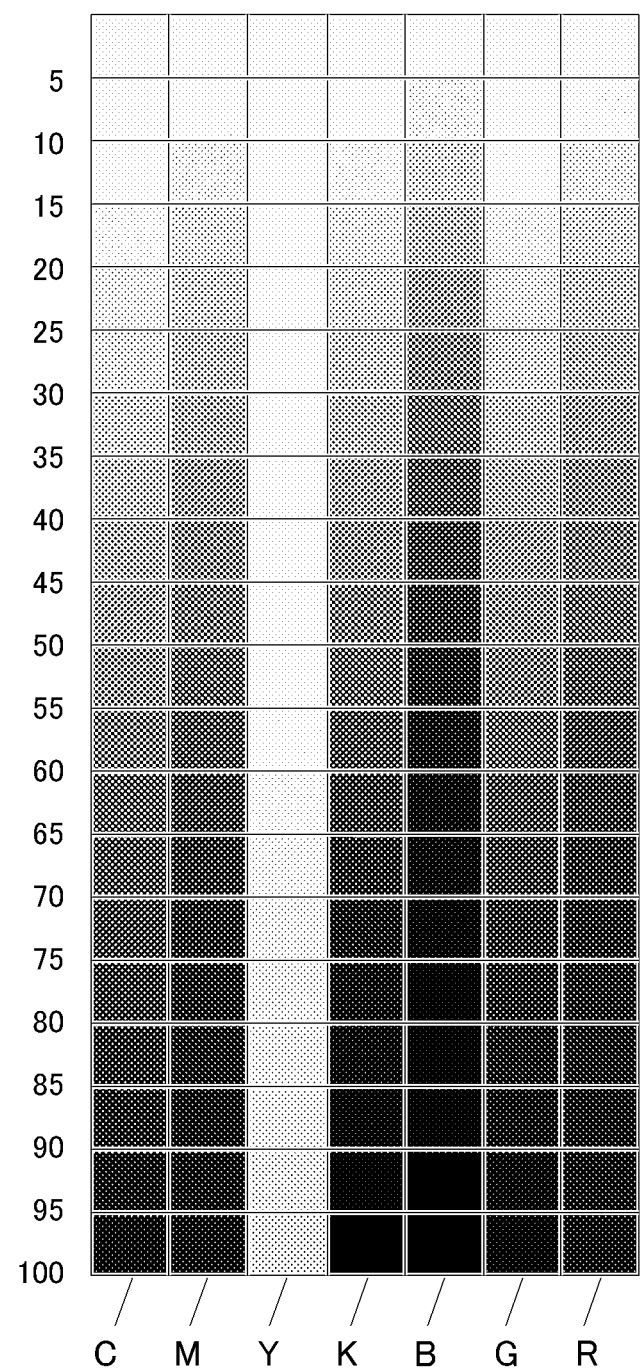
FIG. 7 is a diagram showing a configuration of a document image produced in the example.

By the following scanning method, a combination of the ink set A and the processing liquid shown in Table III was used to prepare high-density to low-density solid color images in which the amount of ink applied was changed as shown in FIG. 7. The vertical axis in FIG. 7 shows the application amount of the ink (%).

[Formation of Image 1]
(Scanning Method)

An independently driven inkjet head (360 dpi, ejection volume: 7 μL, 15 μL, 23 μL) manufactured by Konica Minolta Inc. was installed as shown in FIG. 1, and the head and stages were moved to form solid ink images of high density, medium-high density, medium density, medium-low density, and low density by using a polyester film (FE2001, thickness: 50 micrometers, manufactured by Futamura Chemical Co., Ltd.,) as a recording medium. An ink set A composed of CMYK inks and a processing liquid A were ejected onto the recording medium, and an application amount of the ink and an application amount of the processing liquid are shown in Table III.

At this time, the high, medium-high, medium, medium-low, and low densities are the densities corresponding to the maximum concentration (100%, 80%, 60%, 40%, and 20%) among the densities obtained by dividing 100 to 0% by 5 for C, M, Y, and K. For R, G, and B, the densities corresponding to the maximum concentration (200%, 160%, 120%, 80%, and 40%) among the densities obtained by dividing 200% to 0% obtained by doubling the density by 5.

Further, the order of application of Pr and CMYK may be either first or second, or both, with respect to CMYK.

In addition, at the time of solid image formation of each color, a 6-point outline character image having the configuration shown in FIG. 3 was formed.

The moving speed of the inkjet head was set to 500 mm/sec. An image of 720 dpi×720 dpi was formed as four images (180 dpi×180 dpi) obtained by dividing each image into two in the head moving direction and the stage moving direction, and one print area was printed four times to form an image.

After printing by the inkjet method, the recording medium was put into a dryer and dried at each set temperature for 10 minutes to obtain an image recording product.

In the production of the image 1, the edge processing and the application of the processing liquid to the peripheral region were not performed.

[Formation of Image 2]

In the preparation of the above-described image 1, the image 2 was produced in the same manner as described above except that the edge processing was performed according to the following method.

Edge processing was performed according to the following method.

(Halftone Processing)

This is a method of expressing the image density as the area gradation such as the size of the dots formed by the ink and the surface density, and halftone processing was performed by applying a known error diffusion method.

(Edge Detection)

The edges (portions having a large difference of the density) of CMYK image prior to halftone processing were detected by a Canny method.

Next, the processing liquid was applied to an inside of the 6-point outline character image in a region of 0.176 mm from the end (edge) portion so that the application amount to the peripheral region was set to be 125% when the application amount to the end portion of the image region was 100%.

[Formation of Image 3]

In the preparation of the above-described image 2, an image 3 was produced in the same manner except that the processing liquid was applied to an inside of the 6-point outline character image in a region of 0.176 mm from the end (edge) portion so that the application amount to the peripheral region was set to be 75% when the application amount to the end portion of the image region was 100%.

[Formation of Image 4]

In the preparation of the above-described image 2, an image 4 was produced in the same manner except that the processing liquid was applied to an inside of the 6-point outline character image in a region of 0.176 mm from the end (edge) portion so that the application amount to the peripheral region was set to be 100% when the application amount to the end portion of the image region was 100%.

[Formation of Image 5]

In the preparation of the above-described image 4, the image 5 was produced in the same manner except that the application of the processing liquid to the region adjoining to the edge detection portion was not performed in the region where the ink application amount was equal to or less than 15 g/m$^2$.

[Formation of Image 6]

In the preparation of the above-described image 4, the image 6 was produced in the same manner except that the region from the edge detection portion to which the processing liquid was applied was changed to 0.141 mm.

[Formation of Image 7]

In the preparation of the above-described image 4, the image 7 was produced in the same manner except that the region from the edge detection portion to which the processing liquid was applied was changed to 0.035 mm.

[Formation of Image 8]

In the preparation of the above-described image 4, the image 8 was produced in the same manner except that the processing liquid was changed from the processing liquid A to the processing liquid B.

[Formation of Image 9]

In the preparation of the above-described image 4, the image 9 was produced in the same manner except that the processing liquid was changed from the processing liquid A to the processing liquid C.

<<Evaluation of the Quality of Outline Characters>>

In the above image formation, the bleeding status of the image was visually observed and evaluated according to the following ranks, with respect to the image quality in which 6-point of outline characters were drawn on the solid image of each color of each set ink application amount.

1: No bleeding or unevenness is observed.

2: Slight bleeding and unevenness are observed, but the quality is practically satisfactory.

3: Clear bleeding and unevenness are observed, and the quality lacks sharpness.

The results obtained by the above are shown in Table III.

TABLE III

|  |  |  |  | Image No. |  |  |  |  |  |  |  |
|---|---|---|---|---|---|---|---|---|---|---|---|
|  |  |  |  | 1 | | 2 | | 3 | | 4 | | 5 |
|  |  |  | Unit | CMYK | RGB | CMYK | RGB | CMYK | RGB | CMYK | RGB | CMYK |
| Printing condition | Application amount of the ink | High density | g/m$^2$ | 11.9 | 24.2 | 11.9 | 24.2 | 11.9 | 24.2 | 11.9 | 24.2 | 11.9 |
|  |  | Medium-high density | g/m$^2$ | 8.4 | 16.1 | 8.4 | 16.1 | 8.4 | 16.1 | 8.4 | 16.1 | 8.4 |
|  |  | Medium density | g/m$^2$ | 4.3 | 9.6 | 4.3 | 9.6 | 4.3 | 9.6 | 4.3 | 9.6 | 4.3 |
|  |  | Medium-low density | g/m$^2$ | 2.5 | 5.3 | 2.5 | 5.3 | 2.5 | 5.3 | 2.5 | 5.3 | 2.5 |
|  |  | Low density | g/m$^2$ | 0.7 | 1.7 | 0.7 | 1.7 | 0.7 | 1.7 | 0.7 | 1.7 | 0.7 |
|  | Application amount of the processing liquid | High density | g/m$^2$ | 2.8 | 2.8 | 2.8 | 2.8 | 2.8 | 2.8 | 2.8 | 2.8 | 2.8 |
|  |  | Medium-high density | g/m$^2$ | 2.8 | 2.8 | 2.8 | 2.8 | 2.8 | 2.8 | 2.8 | 2.8 | 2.8 |
|  |  | Medium density | g/m$^2$ | 2.7 | 2.8 | 2.7 | 2.8 | 2.7 | 2.8 | 2.7 | 2.8 | 2.7 |
|  |  | Medium-low density | g/m$^2$ | 1.9 | 2.8 | 1.9 | 2.8 | 1.9 | 2.8 | 1.9 | 2.8 | 1.9 |
|  |  | Low density | g/m$^2$ | 0.7 | 1.4 | 0.7 | 1.4 | 0.7 | 1.4 | 0.7 | 1.4 | 0.7 |
|  |  | Edge processing |  | Absent | | Present | | Present | | Present | | Present (*B) |

TABLE III-continued

| | | | | | | | | | | |
|---|---|---|---|---|---|---|---|---|---|---|
| | Ratio of an application amount of the peripheral region to an application amount of the end portion | | % | — | 125 | | 75 | | 109 | 100 |
| | Protruding amount in edge processing | | mm | — | 0.176 | | 0.176 | | 0.176 | 0.176 |
| Ink | Ink set No. | | | A | A | | A | | A | A |
| | Static surface tension | | mN/ | 28.7 | 28.7 | | 28.7 | | 28.7 | 28.7 |
| Processing liquid | Processing liquid No | | | A | A | | A | | A | A |
| | Static surface tension | | mN/ | 28.8 | 28.8 | | 28.8 | | 28.8 | 28.8 |
| | Dynamic surface tension (50 ms) | | mN/ | 38.3 | 38.3 | | 38.3 | | 38.3 | 38.3 |
| Evaluation result | Quality of outline character | High density | | 2 | 3 | 3 | 2 | 3 | 3 | 2 | 1 | 1 |
| | | Medium-high density | | 2 | 3 | 3 | 2 | 3 | 3 | 2 | 1 | 1 |
| | | Medium density | | 2 | 2 | 3 | 3 | 3 | 3 | 2 | 2 | 1 |
| | | Medium-low density | | 2 | 2 | 3 | 3 | 3 | 3 | 2 | 2 | 1 |
| | | Low density | | 2 | 2 | 3 | 3 | 3 | 3 | 2 | 2 | 1 |
| | Remarks | | | | Comparative Example | | Comparative Example | | Comparative Example | Present Invention | Present Invention |

| | | | | Image No. | | | | | | | | | |
|---|---|---|---|---|---|---|---|---|---|---|---|---|---|
| | | | | 5 | 6 | | 7 | | 8 | | 9 | |
| | | | Unit | RGB | CMYK | RGB | CMYK | RGB | CMYK | RGB | CMYK | RGB |
| Printing condition | Application amount of the ink | High density | g/m² | 24.2 | 11.9 | 24.2 | 11.9 | 24.2 | 11.9 | 24.2 | 11.9 | 24.2 |
| | | Medium-high density | g/m² | 16.1 | 8.4 | 16.1 | 8.4 | 16.1 | 8.4 | 16.1 | 8.4 | 16.1 |
| | | Medium density | g/m² | 9.5 | 4.3 | 9.6 | 4.3 | 9.6 | 4.3 | 9.6 | 4.3 | 9.6 |
| | | Medium-low density | g/m² | 5.3 | 2.5 | 5.3 | 2.5 | 5.3 | 2.5 | 5.3 | 2.5 | 5.3 |
| | | Low density | g/m² | 1.7 | 0.7 | 1.7 | 0.7 | 1.7 | 0.7 | 1.7 | 0.7 | 1.7 |
| | Application amount of the processing liquid | High density | g/m² | 2.8 | 2.8 | 2.8 | 2.8 | 2.8 | 2.8 | 2.8 | 2.8 | 2.8 |
| | | Medium-high density | g/m² | 2.8 | 2.8 | 2.8 | 2.8 | 2.8 | 2.8 | 2.8 | 2.8 | 2.8 |
| | | Medium density | g/m² | 2.8 | 2.7 | 2.8 | 2.7 | 2.8 | 2.7 | 2.8 | 2.7 | 2.8 |
| | | Medium-low density | g/m² | 2.8 | 1.9 | 2.8 | 1.9 | 2.8 | 1.9 | 2.8 | 1.9 | 2.8 |
| | | Low density | g/m² | 1.4 | 0.7 | 1.4 | 0.7 | 1.4 | 0.7 | 1.4 | 0.7 | 1.4 |
| | Edge processing | | | Present (*B) | Present | | Present | | Present | | Present | |
| | Ratio of an application amount of the peripheral region to an application amount of the end portion | | % | 100 | 100 | | 100 | | 100 | | 100 | |
| | Protruding amount in edge processing | | mm | 0.176 | 0.141 | | 0.035 | | 0.176 | | 0.176 | |
| Ink | Ink set No. | | | A | A | | A | | A | | A | |
| | Static surface tension | | mN/ | 28.7 | 28.7 | | 28.7 | | 28.7 | | 28.7 | |
| Processing liquid | Processing liquid No | | | A | A | | A | | B | | C | |
| | Static surface tension | | mN/ | 28.8 | 28.8 | | 28.8 | | 26.7 | | 25.5 | |
| | Dynamic surface tension (50 ms) | | mN/ | 38.3 | 38.3 | | 38.3 | | 35.6 | | 32.1 | |
| Evaluation result | Quality of outline character | High density | | 1 | 1 | 1 | 1 | 1 | 1 | 1 | 1 | 1 |
| | | Medium-high density | | 1 | 1 | 1 | 1 | 1 | 1 | 1 | 1 | 1 |
| | | Medium density | | 1 | 1 | 1 | 1 | 1 | 1 | 1 | 1 | 1 |
| | | Medium-low density | | 1 | 1 | 1 | 1 | 1 | 1 | 1 | 1 | 1 |
| | | Low density | | 1 | 1 | 1 | 1 | 1 | 1 | 1 | 1 | 1 |
| | Remarks | | | Present Invention | Present Invention | | Present invention | | Present invention | | Present Invention | |

(*B): When an amount of the ink applied is 15 g/m2 or less, the processing liquid is not applied.

As is apparent from the results listed in Table III, it can be seen that an image formed according to an inkjet recording method defined in the present invention is superior to a comparative example in outline character quality.

As a result of evaluating the color bleeding resistance of the above-formed images according to a conventional method, the present invention exhibited an excellent effect.

Although embodiments of the present invention have been described and illustrated in detail, the disclosed embodiments are made for purposes of illustration and example only and not limitation. The scope of the present invention should be interpreted by terms of the appended claims.

What is claimed is:

1. An inkjet recording method comprising the step of forming an image by applying an ink containing at least a coloring material and a processing liquid containing at least a flocculant to a surface of a recording medium by a droplet discharge device, respectively, to coalescence the ink and the processing liquid,
wherein the processing liquid is applied to an image forming region on which the image is formed and a peripheral region of the image forming region, and an application amount of the processing liquid to be applied to the peripheral region of the image forming region is controlled to be the same as an application amount of the processing liquid to be applied at an end portion of the image forming region, and
the inkjet recording method is controlled so that the processing liquid is not applied to the peripheral region of the image forming region when an application amount of the ink at the end portion of the image forming region is equal to or less than 15 g/m².

2. The inkjet recording method described in claim 1, wherein the peripheral region of the image forming region is a region within a range of 0.030 to 0.150 mm outside an outer periphery of the image forming region starting from the outer periphery of the image forming region.

3. The inkjet recording method described in claim 1, wherein a surface tension of the processing liquid at 25° C. is smaller than a surface tension of the ink.

4. The inkjet recording method described in claim 1, wherein the processing liquid contains a polyvalent metal salt or a solution cationic polymer as the flocculant, and the processing liquid does not contain resin fine particles.

5. The inkjet recording method described in claim 1, wherein a dynamic surface tension of the processing liquid at 25° C. and a lifetime of 50 ms is 35 mN/m or less determined by a maximum bubble pressure method.

6. An inkjet recording apparatus for forming an image by applying an ink containing at least a coloring material and a processing liquid containing at least a flocculant to a surface of a recording medium by a droplet discharge device, respectively, to coalescence the ink and the processing liquid, comprising at least the droplet discharge device having a discharge port for discharging the ink and a discharge port for discharging the processing liquid,
wherein the inkjet recording apparatus includes a device for applying the processing liquid to an image forming region in which the image is formed and a peripheral region of the image forming region, and controlling an application amount of the processing liquid applied to the peripheral region of the image forming region to be the same as an application amount of the processing liquid applied at an end portion of the image forming region, wherein the device is controlled so that the processing liquid is not applied to the peripheral region of the image forming region when an application amount of the ink at the end portion of the image forming region is equal to or less than 15 $g/m^2$.

* * * * *